No. 721,309. PATENTED FEB. 24, 1903.
D. E. JOHNSON.
DEVICE FOR TRANSMITTING POWER FROM CAR AXLES.
APPLICATION FILED APR. 25, 1902.
NO MODEL.
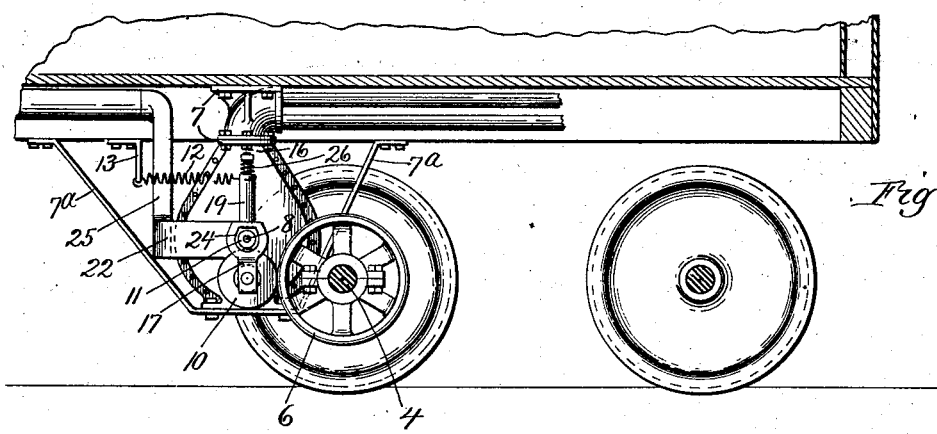
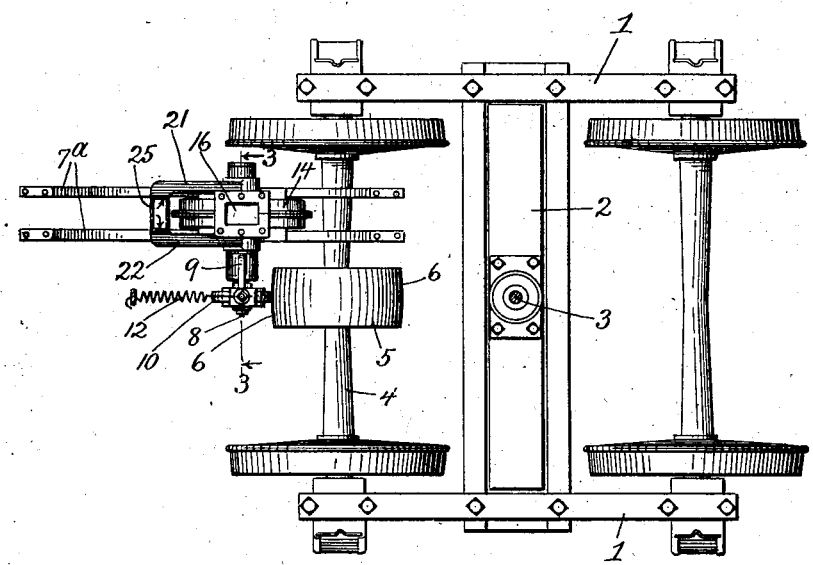
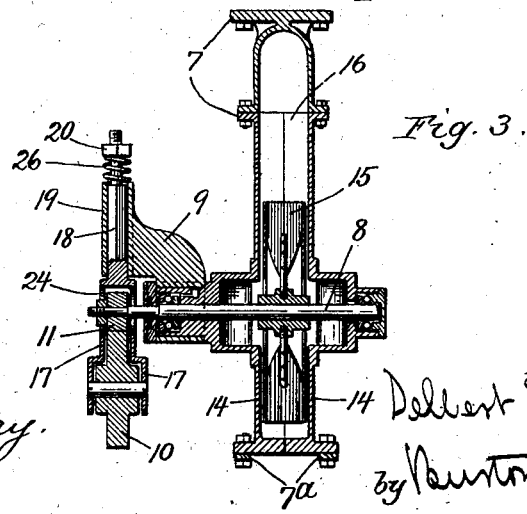
Witnesses,
Edward T. Wray.
A. J. Bell.
Inventor.
Delbert E. Johnson
by Burton Burton
his Atty's.

UNITED STATES PATENT OFFICE.

DELBERT E. JOHNSON, OF CHICAGO, ILLINOIS.

DEVICE FOR TRANSMITTING POWER FROM CAR-AXLES.

SPECIFICATION forming part of Letters Patent No. 721,309, dated February 24, 1903.

Application filed April 25, 1902. Serial No. 104,664. (No model.)

*To all whom it may concern:*

Be it known that I, DELBERT E. JOHNSON, a citizen of the United States, residing at Chicago, in the county of Cook and State of Illinois, have invented certain new and useful Improvements in Devices for Transmitting Power from Car-Axles, of which the following is a specification, reference being had to the accompanying drawings, forming a part thereof.

The purpose of this invention is to provide an improved means for transmitting power from the axle of a car-wheel to any device requiring power on or in the car.

It consists in the features of construction and relative location and arrangement of pulleys on the car-axle and on the power-transmitting device, which are set out in the claims, and, specifically, the adaptation of the devices shown to operate a fan for the purpose of pneumatic transmission of energy to points within the car.

The car-truck is represented in a conventional form by the frame-bars 1 1, &c., and bolster-beam 2, the vertical axis of the truck being indicated by the position of the king-bolt 3. On one of the axles, preferably the innermost axle of the truck, as 4, I mount a pulley 5, whose face is curved in radial section about the vertical axis of the truck. Preferably, as illustrated, the radius of curvature is the distance from the vertical axis to the remote periphery of the pulley, so that said pulley has its face convex outward, as seen at 6. If the construction of the truck were such as to make it feasible to mount the power-transmitting device so as to take power from the inner side of the pulley—that is, the side toward the other axle of the truck—the curvature would be still about the same center, but with a radius reaching only to the proximate instead of the remote face, and said face would then manifestly be concave instead of convex.

Upon the car-body I mount rigidly a hanger 7, the particular form of which is adapted to the particular style of mechanism to be operated and which will be more particularly hereinafter described. In this hanger there is journaled a shaft 8, (in the structure shown in the drawings the fan-shaft.) About the axis of this shaft there is pivoted a hanger 9, having journaled in it a pulley 10, whose periphery is in position to bear against the convex periphery of the pulley 6, the axis of said pulley 10 being, with slight range of variation, substantially at the horizontal plane of the axle 4. I provide suitable means for communicating power from the pulley 10 to the shaft 8. The most simple construction and suitable for many purposes is that shown in the drawings, in which, on the shaft 8, there is a friction-pulley 11, which is held in driving contact with the pulley 10. A spring 12, connected to the hanger 9 and to a fixed attachment on the car-body, as the bracket 13, operates with a tendency to hold the pulley 10 in contact with the convex face 6 of the pulley 5 in such oscillation of the hanger as may be necessary to maintain such contact throughout any longitudinal shifting of the car-body with respect to the truck. The pulley 10 will maintain its contact with the pulley 11 throughout such oscillation of the hanger, because the hanger 9 is fulcrumed about the shaft of said pulley. The pulley 5 is preferably and for practical purposes almost necessarily located at the middle point in the length of the axle—that is, in the longitudinal plane of the vertical axis of the truck. Whether in this position or not its face will be curved, as stated, about the said vertical axis. When it is in the middle position, such curvature makes it symmetrical about the vertical longitudinal central plane of the truck and the car, as shown in the drawings. It will be seen that with this construction the change of relative position of truck and car-body which is caused in passing curves, requiring the truck to swivel with respect to the car about its vertical axis, only causes the pulley 10 to bear upon a different point in the curved face 6 of the pulley 5, but does not tend to take it out of contact or cause it to operate otherwise than with the direct rolling action by which the movement of the one pulley may be transmitted to the other with the minimum friction and without the friction or rubbing which would result from any distorted relation of the two pulleys. It will be seen also that the driving action will be communicated without interruption due to any longitudinal relative displacement of car and truck, such longitudinal change of relative position being compensated constantly by the action of the spring 12.

In the drawings I have shown the mechanism which I have above described in general terms in a specific form, in which the shaft 8 is that of a fan which is to be operated to transmit energy pneumatically into the car, the hanger 7 being therefore in form to constitute, comprise, or support the fan-case, which is specifically indicated at 14. This fan-case is symmetrical about the vertical plane in which its axis lies, so that it may be arranged to have a circumaxial intake at each side and a peripheral discharge sustaining the same relation to the fan whether the latter rotates in one direction or the other.

15 is the fan; 16, the discharge-mouth of the fan-case.

The hanger 9 for the pulley 10 is preferably made in two parts, the upper of which is directly fulcrumed on the hanger 7 at the hub of the fan-case in which the shaft 8 is journaled, while the lower member 17, having a square stem 18, which extends up through the sleeve 19 of said upper member and is apertured at 24 around the shaft 8, has the bearings for the pulley 10, which is by this construction adapted to be held in driving contact with the pulley 11 by means of a spring 26 on the upper end of the stem of said lower member, where it protrudes above the end of the sleeve 19, a nut 20 above the spring being employed to adjust its tension as may be found necessary. The fan-case has two arms 21 and 22, which fork to embrace the fan-chamber between them and make connection with the same at the center at opposite sides for the purpose of supplying air at the two central inlets at said sides respectively, and said arms, together with a trunk 25, extending from their junction, are hollow, said trunk being mounted on the car-body, so arranged that its end at which it is attached to the latter communicates through the frame or casing of the car to the interior of the latter, so that the air may be drawn from within the car, and, specifically, from any particular chamber, cavity, or passage therein, to supply the fan, and the fan and the discharge-mouth 16 of the fan, around which the attachment of the hanger to the car-body is made, in like manner communicate with the interior of the car. It will be seen that this construction makes it possible to connect the hollow hanger, which constitutes the inlet-duct, and the discharge-mouth, which constitutes the discharge-duct, of the fan to the same chamber or device, through which the fan will then maintain a continuous circulation for any purpose for which it may be desired, whether to develop motive power or for the mere purpose of the circulation itself.

I claim—

1. In combination with a car, a pulley on one axle, a shaft journaled on the car-body for transmitting power to mechanism on the car, a hanger pivoted about the axis of such shaft, and a friction-pulley journaled in the hanger and arranged to bear against the axle-pulley, said axle-pulley having its face curved about a center in the vertical axis of the truck, with a radius equal to the distance from said axis through the axle-axis to the point of contact between said pulleys.

2. In combination with a car, a pulley on one axle having its face curved in horizontal axial plane about the vertical axis of the truck, a shaft carried by the car in transmitting power to mechanism thereon, a hanger pivoted about the axis of such shaft, a friction-pulley journaled in such hanger having its axis substantially at the horizontal plane of the axle, and means for transmitting motion from such friction-pulley to said shaft.

3. In combination with a car, a pulley on one axle, a shaft journaled on the car, a hanger pivoted about the axis of such shaft, a friction-pulley journaled in the hanger and arranged to bear against the axle-pulley, said axle-pulley having its face curved in an axial plane through the point of contact with the friction-pulley therewith about the point of intersection of such plane with the vertical axis on the truck, and means for transmitting power from the friction-pulley to said shaft.

4. In combination with a car, a pulley on one axle having its face curved in horizontal axial plane about the vertical axis of the truck, a hanger pivotally supported on the car, a friction-pulley journaled in such hanger, and a spring operating on the hanger for holding the friction-pulley against the axle-pulley, and means for transmitting power from the friction-pulley to mechanism on the car.

5. In combination with a car, a pulley on one axle, having its face convex, with a radius substantially equal to the distance from the vertical axis of the truck horizontally to the remote periphery of such axle; a shaft journaled on the car-body for transmitting power to mechanism on the car; a hanger pivoted about the axis of such shaft; a friction-pulley journaled in such hanger, having its axis substantially at the horizontal plane of the car-wheel axle, and means for transmitting motion from such friction-pulley to said shaft.

6. In combination with a car, a pulley on one of the axles at substantially the middle point of its length, having its face at the side remote from the vertical axis of the truck, convex about said axls; a shaft journaled on the car-body for transmitting power to mechanism on the car; a hanger pivoted about the axis of such shaft; a friction-pulley journaled in the hanger, having its axis substantially at the horizontal plane of the axle; a spring, operating on the hanger, tending to hold such friction-pulley against the convex face of the pulley on the axle, and a pulley on the shaft by which the latter derives movement from said friction-pulley.

7. In combination with a car, a friction-pulley mounted on one axle, having its periphery at the side remote from the vertical axis of the truck curved about said axis; a shaft journaled on the car-body; a hanger pivoted on the shaft; a friction-pulley journaled on the hanger and adapted to bear against the convex face of the axle-pulley; a spring operating on the hanger, tending to hold said pulleys in contact, and a mechanism for developing energy, mounted on the car-body and operated by said shaft.

8. In combination with a car, a friction-pulley mounted on one axle, having its face at the side remote from the vertical axis of the truck curved about such axis; a centrifugally-discharging fan mounted on the car-body below the same; a hanger pivoted about the fan-shaft; a friction-pulley on the hanger, and a pulley on the fan-shaft in driving contact therewith, having its axis substantially at the level of the car-axle, and a spring operating on the hanger tending to hold the friction-pulley against the axle-pulley.

In testimony whereof I have hereunto set my hand, at Chicago, Illinois, in the presence of two witnesses, this 3d day of April, A. D. 1902.

DELBERT E. JOHNSON.

Witnesses:
CHAS. S. BURTON,
I. W. WESTERLAM.